C. F. JACOBS.
METHOD OF WELDING OBJECTS.
APPLICATION FILED MAR. 20, 1919.

1,330,446.

Patented Feb. 10, 1920.

Inventor:
Charles F. Jacobs

UNITED STATES PATENT OFFICE.

CHARLES F. JACOBS, OF CHICAGO, ILLINOIS.

METHOD OF WELDING OBJECTS.

1,330,446.  Specification of Letters Patent.  Patented Feb. 10, 1920.

Application filed March 20, 1919. Serial No. 283,717.

*To all whom it may concern:*

Be it known that I, CHARLES F. JACOBS, a citizen of the United States, residing at Chicago, in the county of Cook and State of Illinois, have invented a certain new and useful Improvement in Methods of Welding Objects, of which the following is a full, clear, concise, and exact description.

My invention relates to the welding of iron or other weldable metal objects that are, in accordance with the invention, brought to welding heat by being inserted within circuit continuing heating receptacles which usually employ electrodes that are presented to the receptacle interiors. These receptacles hold material that is heated to a heat adapted to bring the objects to be welded to welding heat by current conveyed by the electrodes. The material which is electrically heated is sufficiently loose or non-rigid to permit of the immersion therein of the objects to be heated thereby. Such loose material may preferably be in the nature of flux that is desirably in a molten condition before it is placed in the receptacle and is maintained in such condition by the current, flux in a non-molten condition being a non-current conductor. When initially molten the flux offers sufficient resistance to the flow of current to enable it further to be heated by the passing current, the heat being transferred from the further heated flux to the object immersed therein. In the preferred embodiment of the invention the objects themselves constitute supplemental electrodes through which current is also conveyed to the flux. In this way the progress and extent of the heating of the objects may be regulated.

Figure 1:
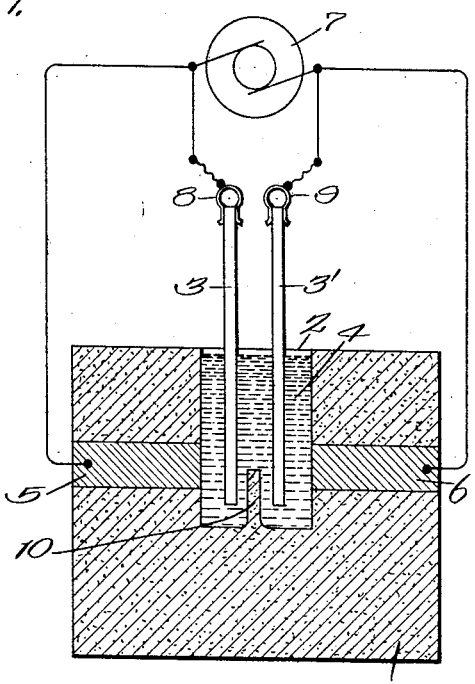
Figure 3:
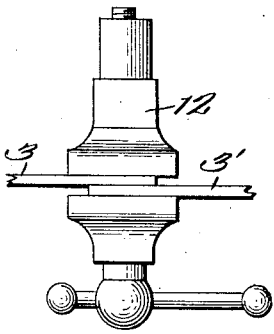
Figure 2:
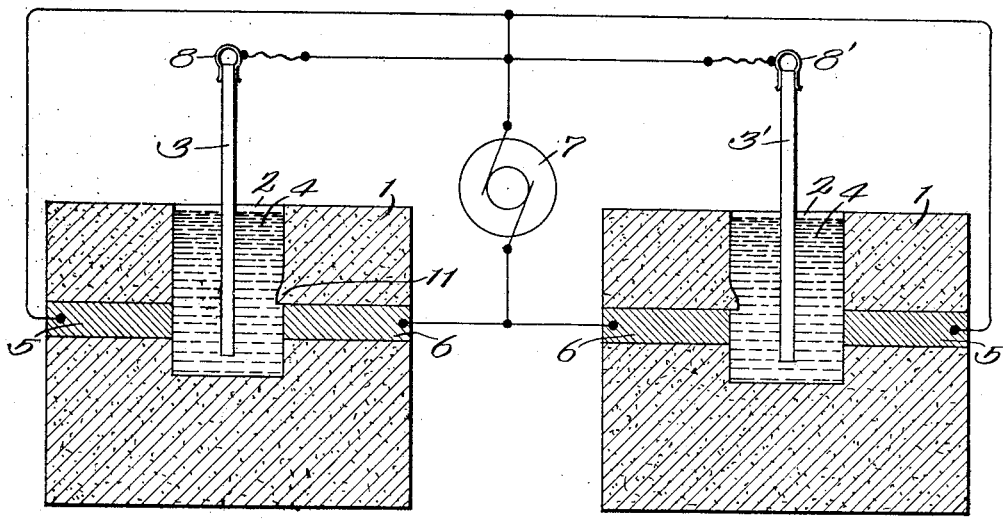

I will explain two ways of practising my invention by reference to the accompanying drawing showing apparatus that may be employed and in which drawing Figure 1 is an illustration diagrammatically showing one way of practising several steps of the invention; Fig. 2 is a diagrammatic illustration showing another way of practising several steps of the invention; and Fig. 3 is a view illustrating a press for practising the final step of the invention.

Like parts are indicated by similar characters of reference throughout the different figures.

Each of the illustrated circuit continuing receptacles 1, made preferably of refractory material, has an open side 2, which is preferably the top side, which permits entry of the iron or other weldable metal objects 3, 3' that are to be heated by the object heating material 4 that is disposed in each receptacle for this purpose. This object heating material is preferably in the form of flux which is maintained in liquid condition by the passage of heating current. Electrodes 5 and 6, preferably of graphite, extend to the receiving space of the receptacle.

In the apparatus illustrated in Fig. 1 there is included a suitable source of current 7 in circuit with the electrodes 5 and 6 and the molten flux 4. A clip 8 is connected with the same terminal of the generator 7 with which the electrode 5 is connected. The object 3 is removably held in this clip. The clip 9 is connected with the same terminal of the generator 7 with which the electrode 6 is connected. The object 3' is removably held in this clip 9. To keep the two objects 3, 3' apart and thereby avoid short circuiting of the generator, the receptacle 4 may have a bridge piece 10 on one side of which the object 3 is inserted in the receiving space of the receptacle and on the other side of which the object 3' is inserted within the receiving space of the receptacle.

In the apparatus of Fig. 2 there are two receptacles 1, each having an electrode 5 and each having an electrode 6. The two electrodes 5 are connected with one terminal of the generator and the two electrodes 6 are connected with the other terminal of the generator. In the apparatus of Fig. 2 there is no counterpart of the clip 9, the two clips 8, 8' being connected with the same terminal of the generator 7 with which the electrodes 5 are connected, the objects 3, 3' being respectively removably held in these clips 8, 8'. The objects 3, 3' are prevented from having short circuiting engagement with the electrodes 6 by the guarding formations 11 which are set forth in my co-pending application Serial No. 283,716, filed March 20, 1919.

The heating material 4, if it is flux, is preferably placed within the receptacles when initially in a molten condition. Such material is maintained in this molten condition by current from the generator 7, the heat furnished by this current being preferably sufficient to bring the flux to such a degree of heat as to enable it to impart welding heat to the objects 3, 3′ that are to be welded. Each of the objects 3, 3′ is removably included in circuit with the generator and a portion of the flux.

In Fig. 1 the object 3 is included in circuit with the electrode 6 and a portion of the flux 4 and the object 3′ is included in circuit with the electrode 5 and a portion of the flux 4.

In the apparatus of Fig. 2 the objects 3, 3′ are included respectively in circuit with electrodes 6 and the portions of the flux between these electrodes and the corresponding objects.

The arrangement of Fig. 2 may be preferred since thereby there is no liability of the objects 3, 3′ coming together while being brought to a welding heat. This is due not only to the separation of the bodies of flux but also to the fact that the objects 3, 3′ are of similar polarity with no potential drop therebetween. The heating current is not only conveyed by a single circuit that includes the electrodes 5 and 6 of each receptacle, but is also conveyed by two additional circuits in the apparatus of Fig. 1, one of these additional circuits including the electrode 5 and the object 3 and the other of these additional circuits including the electrode 6 and the object 3′. In Fig. 2 each of the receptacles is provided with two circuits, one circuit having the electrodes 5 and 6 and the other circuit having the electrode 6 and the corresponding object 3 or 3′. The flux in the receptacle of Fig. 1 is thus heated by current conveyed by three circuits and the flux in each of the receptacles of Fig. 2 is heated by two circuits. Each of the objects 3, 3′ is desirably movable about within the flux in which it is inserted whereby the degree and extent of the heating of such objects may more readily be regulated. When the structure of Fig. 2 is employed at least one of the objects has to be removed after the objects have been brought to welding heat and both objects are preferably removed, it being desirable to complete the welding operation outside the receptacles. I do not wish to be limited to this characteristic however. In all methods of practising the invention preferably at least one and desirably both of the objects are removed from circuit before the welding process is complete and after the removal of such objects from circuit they are placed in engagement where they are to be welded. In Fig. 3 a lap weld is illustrated, the overlapping objects being placed within the vise 12 that serves to press one object against the other where these objects engage each other thereby to finish the welding process. The invention is inclusive of all forms of welding, and I do not therefore limit myself to lap welding nor to the welding of metal objects that are iron.

Having thus described my invention I claim as new and desire to secure by Letters Patent the following:—

1. The method of welding metal objects together which consists in including each of two separated bodies of flux in two electric circuits; conveying current through said bodies of flux by said circuits to heat said bodies of flux to a degree to enable them to impart welding heat to the metal objects; including a metal object in one circuit pertaining to each body of flux and inserting this object in such flux body to impart welding heat to this object; withdrawing at least one object from the flux; placing the heated objects together where they are to be welded; and pressing these objects one against the other where they engage each other.

2. The method of welding metal objects together which consists in conveying current through flux to heat said flux to a degree to enable it to impart welding heat to the metal objects that are to be welded; subdividing a portion of the flux heating current and passing a part of the subdivided current portion through each metal object independently of the other; inserting the objects in the flux to impart welding heat to the objects; withdrawing at least one object from circuit; placing the heated objects together where they are to be welded; and pressing these objects one against the other where they engage each other.

3. The method of welding metal objects together which consists in including each of two separated bodies of current conducting heating material in two electric circuits; conveying current through said bodies of current conducting heating material by said circuits to heat said bodies of current conducting heating material to a degree to enable them to impart welding heat to the metal objects; including a metal object in one circuit pertaining to each body of current conducting heating material and inserting this object in such current conducting heating material body to impart welding heat to this object; withdrawing at least one object from the current conducting heating material; placing the heated objects together where they are to be welded; and pressing these objects one against the other where they engage each other.

4. The method of welding metal objects together which consists in conveying current through current conducting heating material to heat said current conducting heating material to a degree to enable it to impart welding heat to the metal objects that are to be welded; subdividing a portion of the heating current and passing a part of the subdivided current portion through each metal object independently of the other; inserting the objects in the current conducting heating material to impart welding heat to the objects; withdrawing at least one object from circuit; placing the heated objects together where they are to be welded; and pressing these objects one against the other where they engage each other.

5. The method of welding metal objects together which consists in conveying current through flux to heat said flux to a degree to enable it to impart welding heat to the metal objects that are to be welded; inserting the objects in the flux to impart welding heat to the objects; placing the objects together where they are to be welded; and pressing these objects one against the other where they engage each other.

6. The method of welding metal objects together which consists in conveying current through current conducting heating material to heat said current conducting heating material to a degree to enable it to impart welding heat to the metal objects that are to be welded; inserting the objects in the current conducting heating material to impart welding heat to the objects; placing the objects together where they are to be welded; and pressing these objects one against the other where they engage each other.

7. The method of welding metal objects together which consists in conveying current through flux to heat said flux to a degree to enable it to impart welding heat to the metal objects that are to be welded; passing a part of the current through each metal object; inserting the objects in the flux to impart welding heat to the objects; placing the heated objects together where they are to be welded; and pressing these objects one against the other where they engage each other.

8. The method of welding metal objects together which consists in conveying current through current conducting heating material to heat said current conducting heating material to a degree to enable it to impart welding heat to the metal objects that are to be welded; passing a part of the current through each metal object; inserting the objects in the current conducting heating material to impart welding heat to the objects; placing the heated objects together where they are to be welded; and pressing these objects one against the other where they engage each other.

In witness whereof I hereunto subscribe my name this 18th day of March, A. D. 1919.

CHARLES F. JACOBS.